US012795240B2

(12) United States Patent
Otoshi

(10) Patent No.: US 12,795,240 B2
(45) Date of Patent: Nov. 10, 2026

(54) IMAGE CAPTURING APPARATUS CAPABLE OF SUPPRESSING DEGRADATION OF DETECTION ACCURACY OF POSITION DETECTING DEVICE

(71) Applicant: CANON KABUSHIKI KAISHA, Tokyo (JP)

(72) Inventor: Tatsuya Otoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 19/169,591

(22) Filed: Apr. 3, 2025

(65) Prior Publication Data

US 2025/0324161 A1 Oct. 16, 2025

(30) Foreign Application Priority Data

Apr. 11, 2024 (JP) ................................. 2024-063883

(51) Int. Cl.
*H04N 23/68* (2023.01)
*H04N 23/52* (2023.01)
*H04N 23/54* (2023.01)

(52) U.S. Cl.
CPC ........... *H04N 23/687* (2023.01); *H04N 23/52* (2023.01); *H04N 23/54* (2023.01)

(58) Field of Classification Search
CPC ...... H04N 23/687; H04N 23/52; H04N 23/54; H04N 23/57
See application file for complete search history.

(56) References Cited

FOREIGN PATENT DOCUMENTS

JP 6846532 B2 10/2020

*Primary Examiner* — Gevell V Selby
(74) *Attorney, Agent, or Firm* — Cowan, Liebowitz & Latman, P.C.

(57) ABSTRACT

An image capturing apparatus including a fixed part and a movable part which is movably arranged relative to the fixed part in a predetermined range within a plane. The movable part includes an image sensor having an imaging surface orthogonal to an optical axis, a movable member that holds the image sensor, a detection FPC fixed to the movable member, and detectors that are arranged at respective locations overlapping the image sensor as viewed from the optical axis direction and mounted on the detection FPC. The fixed part has detection magnet groups arranged at locations opposed to the detectors, respectively. A path which transfers heat generated in the image sensor most readily to the detectors is a path passing through the movable member and the detection FPC, and the detection FPC is lower in thermal conductivity than the movable member.

10 Claims, 11 Drawing Sheets

20b

IMAGE CAPTURING APPARATUS CAPABLE OF SUPPRESSING DEGRADATION OF DETECTION ACCURACY OF POSITION DETECTING DEVICE

BACKGROUND OF THE INVENTION

Field of the Invention

The present invention relates to an image capturing apparatus that is capable of suppressing degradation of detection accuracy of a position detecting device when a temperature in the apparatus rises, and more particularly to an image capturing apparatus equipped with an actuator that performs position control.

Description of the Related Art

Conventionally, there is known an actuator that moves a movable part within a plane relative to a fixed part.

As an example of application of the actuator, there is a shake correction mechanism installed in an image capturing apparatus. In the shake correction mechanism, an image sensor is mounted in the movable part, and the movable part is actuated based on a shake amount detected by a predetermined sensor so as to cancel a shake.

When actuating the movable part, position control of the movable part is performed while detecting the position of the movable part relative to the fixed part. As a system that detects the position of the movable part, there is conventionally known a configuration in which a magnet is arranged in one of the fixed part and the movable part, and a magnetic sensor that outputs a voltage proportional to the magnetic flux density is arranged in the other. For example, Japanese Patent No. 6846532 proposes a configuration in which magnetic sensors are arranged in a movable part, and magnets are arranged in a fixed part, and the magnetic sensors are arranged on a substrate on which an image sensor is mounted, and the magnets are arranged at locations opposed to the magnetic sensors, respectively.

With this arrangement, the density of magnetic fluxes reaching from the magnets to the magnetic sensors varies with a change in the position of the movable part relative to the fixed part, resulting in changes in the voltage outputs from the magnetic sensors, and the position of the movable part is detected based on the output voltage values.

To increase the accuracy of the shake correction mechanism, the accuracy of position detection of the movable part is one of the important elements.

However, in the image capturing apparatus, the temperature of the substrate on which the image sensor is mounted sometimes sharply rises e.g. due to moving image shooting, and hence if the magnetic sensors are mounted on the same substrate on which the image sensor is mounted, as described in Japanese Patent No. 6,846,532, the temperature of the magnetic sensors sometimes largely changes.

The magnetic sensors also have characteristics that the outputs therefrom change in accordance with changes in temperature, and hence there is a fear that the outputs from the magnetic sensors change due to changes in temperature of the magnetic sensors, and as a result, the accuracy of position detection of the movable part can be degraded.

SUMMARY OF THE INVENTION

The present invention provides an image capturing apparatus that is capable of suppressing degradation of detection accuracy of a position detecting device when a temperature in the apparatus rises.

In a first aspect of the present invention, there is provided an image capturing apparatus including a first unit and a second unit which is movably arranged relative to the first unit in a predetermined range within a plane, wherein the second unit includes an image sensor that has an imaging surface orthogonal to an optical axis, a movable member that holds the image sensor, a first substrate that is fixed to the movable member, and a position detecting device that is arranged at a location overlapping the image sensor as viewed from the optical axis direction and mounted on the first substrate, wherein the first unit has a position detecting magnet arranged at a location opposed to the position detecting device, and wherein a path which transfers heat generated in the image sensor most readily to the position detecting device is a path passing through the movable member and the first substrate, and the first substrate is lower in thermal conductivity than the movable member.

In a second aspect of the present invention, there is provided an image capturing apparatus including a first unit and a second unit which is movably arranged relative to the first unit in a predetermined range within a plane, wherein the second unit includes an image sensor that has an imaging surface orthogonal to an optical axis, a movable member that holds the image sensor, a first substrate that is mounted on the movable member, and a position detecting device that is arranged at a location overlapping the image sensor as viewed from the optical axis direction and mounted on the first substrate, wherein the first unit has a position detecting magnet arranged at a location opposed to the position detecting device, wherein the first substrate is lower in thermal conductivity than the movable member, and wherein the position detecting device is not brought into contact with a member which is higher in thermal conductivity than the first substrate.

According to the present invention, it is possible to provide an image capturing apparatus that is capable of suppressing degradation of detection accuracy of the position detecting device when a temperature in the apparatus rises.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. A configuration in which an actuator according to the present invention is applied to an image blur correction unit of an image capturing apparatus will be described by way of example, but the application of the actuator according to the present invention is not limited to the illustrated example of application to the image blur correction unit.

Figure 1:
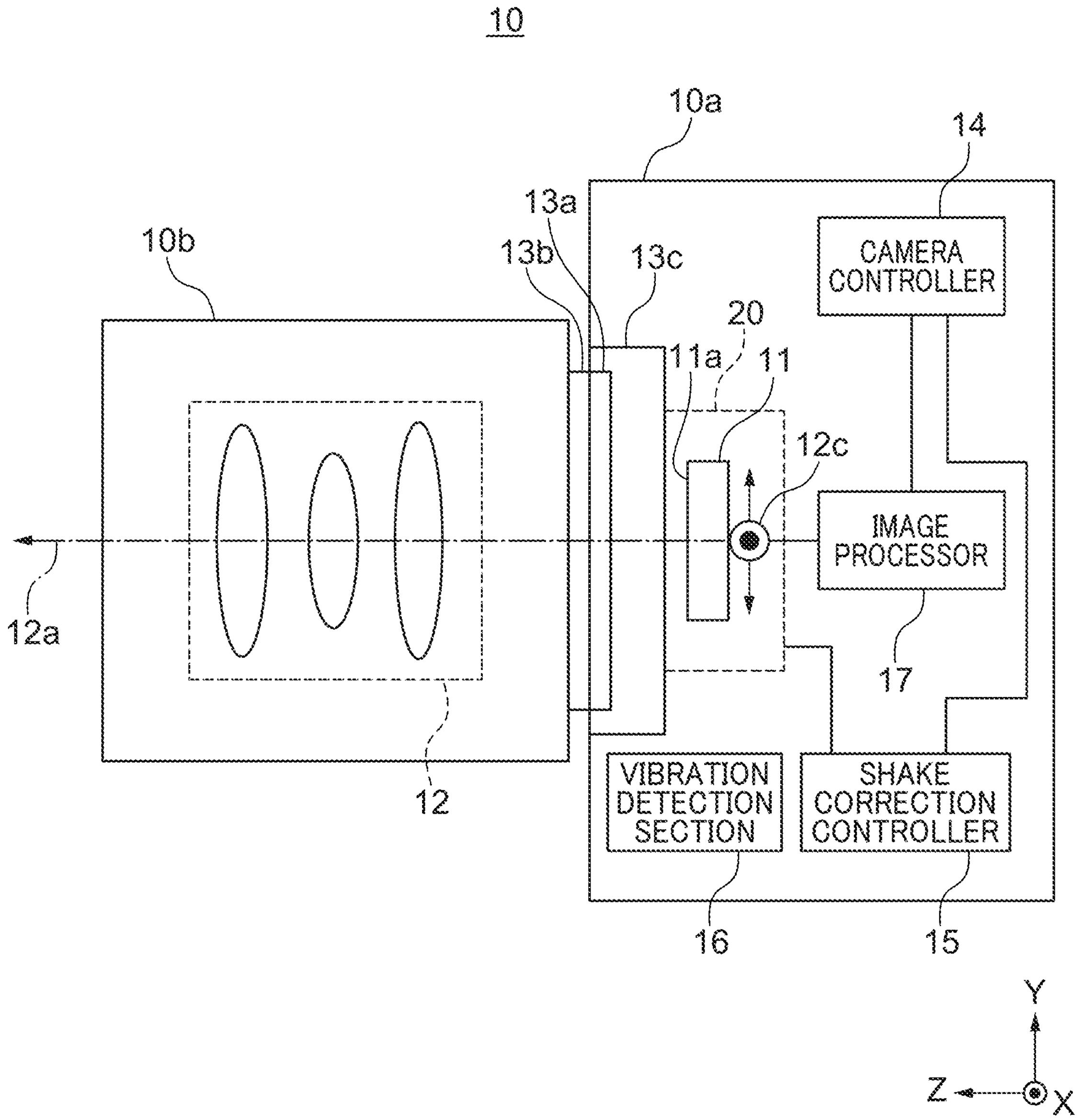
FIG. 1 is a diagram useful in explaining a schematic configuration of an image capturing apparatus according to an embodiment of the present invention.

FIG. 1 is a diagram useful in explaining a schematic configuration of an image capturing apparatus 10 according to an embodiment of the present invention.

The image capturing apparatus 10 is a so-called mirrorless digital camera and has an image capturing apparatus body 10*a* (hereinafter referred to as the "apparatus body 10*a*") and a lens barrel 10*b* which can be removably attached to the apparatus body 10*a*.

The apparatus body 10*a* includes an image sensor 11 having an imaging surface 11*a*, a body-side mount member 13*a*, a base member 13*c*, a camera controller 14, a shake correction controller 15, a vibration detection section 16, an image processor 17, and a shake correction unit 20. Further, the lens barrel 10*b* includes an image capturing optical system 12 and a lens-side mount member 13*b*.

An imaginary line of light as a representative of a light flux irradiated onto the imaging surface 11*a* of the image sensor 11 through the image capturing optical system 12 is referred to as the "image capturing optical axis 12*a*" (hereinafter simply referred to as the "optical axis 12*a*"), and a plane orthogonal to the optical axis 12*a* is referred to as the "optical axis orthogonal plane 12*c*". The optical axis 12*a* passes through the center of the imaging surface 11*a* and is orthogonal to the imaging surface 11*a*. Further, to make clear the arrangement of the components forming the image capturing apparatus 10 therein and the positional relationship between them, an X direction, a Y direction, and a Z direction, which are orthogonal to each other, are defined as illustrated in FIG. 1. The Z direction is a direction parallel to the optical axis 12*a*, the X direction is a width direction of the image capturing apparatus 10, and the Y direction is a height direction of the image capturing apparatus 10. In a case where the X direction and the Z direction are both within a horizontal plane, the Y direction becomes a vertical direction. Therefore, in this case, the optical axis orthogonal plane 12*c* is an X-Y plane.

The image sensor 11 is implemented by a photoelectric conversion device, such as a CMOS image sensor or CCD image sensor, and is arranged such that the imaging surface 11*a* faces toward an object side (toward the lens barrel 10*b*) and is orthogonal to the optical axis 12*a*. The image sensor 11 generates image signals by photoelectrically converting an optical image of an object, which is formed on the imaging surface 11*a* by the image capturing optical system 12. The image signals generated by the image sensor 11 are converted to image data by performing a variety of processing operations in the image processor 17 and stored in a memory (storage device), not shown.

The camera controller 14 is calculating means in a main IC, not shown, receives an input operation from a user via operating means, not shown, and controls the overall operation of the image capturing apparatus 10.

The image capturing optical system 12 is formed by a lens group arranged inside the lens barrel 10*b* and forms an image of a light flux incident from the object side on the imaging surface 11*a* of the image sensor 11. Although FIG. 1 illustrates three lenses included in the lens group, the number of lenses included in the lens group is not limited to three but is only required to be one or more. In the image capturing apparatus 10, to arrange the image sensor 11 with high positional accuracy with respect to the optical axis 12*a*, the image sensor 11 is mounted on the base member 13*c* provided in the apparatus body 10*a*, and the lens barrel 10*b* is also connected to the base member 13*c*. In doing this, the image sensor 11 is mounted on the base member 13*c* via the shake correction unit 20. Further, the lens barrel 10*b* is connected to the base member 13*c* via the lens-side mount member 13*b* and the body-side mount member 13*a*.

The shake correction unit 20 (actuating mechanism) corrects an image blur caused by a shake generated in the image capturing apparatus 10, by moving the image sensor 11 in a direction orthogonal to the optical axis or rotating the same within the optical axis orthogonal plane 12*c*, to thereby make it possible to obtain a clear image. Specifically, if a posture of the image capturing apparatus 10 changes with respect to the object during image capturing, a position where the object light flux is imaged on the imaging surface 11*a* of the image sensor 11 is changed, whereby a blur is caused in an image obtained through the image sensor 11. At this time, in a case where the change in the posture of the image capturing apparatus 10 is sufficiently small, the change in the imaging position is uniform within the imaging surface 11*a* and can be regarded as at least one of translational movement and rotational movement within the optical axis orthogonal plane 12*c* (imaging surface shake). Therefore, by executing at least one of translational movement and rotational movement of the image sensor 11 within the optical axis orthogonal plane 12*c* such that the imaging surface shake is cancelled, it is possible to obtain a clear object image on which the image blur has been corrected. Note that the shake correction unit 20 can be configured to, when moving the image sensor 11 in a direction parallel to the imaging surface 11*a*, move the image sensor 11 in a direction orthogonal to the imaging surface 11*a* as well.

The shake correction unit 20 roughly has a fixed part 20*a*, a movable part 20*b*, and a plurality of actuation force generation sections, as described hereinafter with reference to FIG. 2, etc. The fixed part 20*a* is fixed to the base member 13*c*, and the movable part 20*b* holds the image sensor 11. Further, the movable part 20*b* is supported by the fixed part 20*a* with three degrees of freedom and is disposed in a state movable and rotatable relative to the fixed part 20*a* within the optical axis orthogonal plane 12*c*. That is, the shake correction unit 20 is formed as an actuator (so-called XYθ stage) that is capable of controlling actuation with respect to three axes, and can move and rotate the image sensor 11 within the optical axis orthogonal plane 12*c*.

The vibration detection section 16 is comprised of a gyro sensor and an acceleration sensor and is shake detecting means for detecting an angular speed, an acceleration, and so forth of the image capturing apparatus 10 in each direction, as shake information of the image capturing apparatus 10.

The shake correction controller 15 calculates an angle change amount and an amount of movement of the image capturing apparatus 10 in each direction based on the shake information, such as an angular speed and an acceleration, detected by the vibration detection section 16. Further, the shake correction controller 15 controls the movement of the image sensor 11 by calculating a movement target value of the image sensor 11 based on the shake information detected by the vibration detection section 16 and controlling actuation of the shake correction unit 20. As the method of calculating the angle change amount, the movement amount, and the movement target value, based on the shake information, a known method can be used, and hence detailed description thereof is omitted.

Next, the detailed configuration of the shake correction unit 20 will be described.

Figure 2:
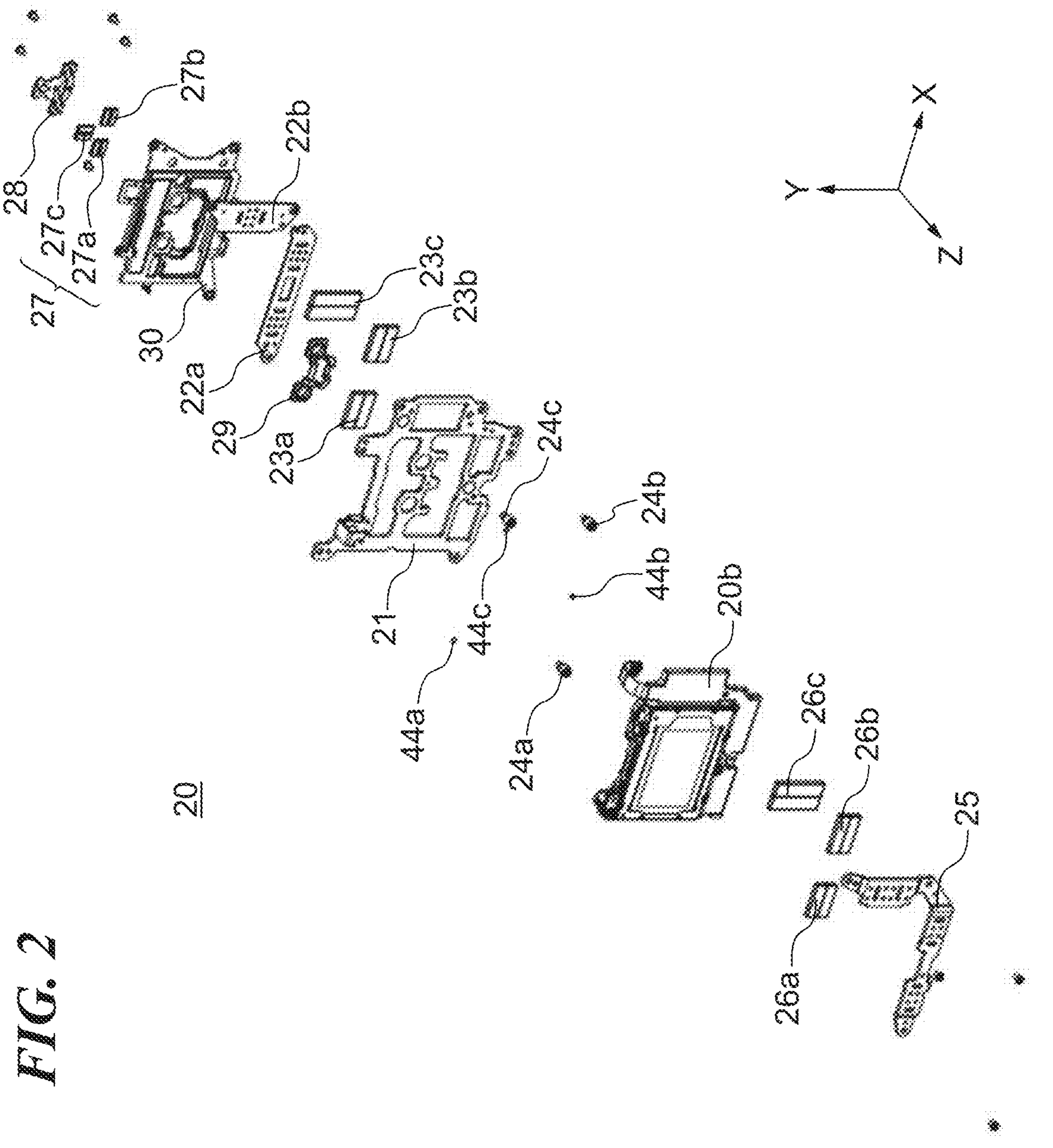
FIG. 2 is an exploded perspective view of a shake correction unit appearing in FIG. 1, including a movable part and a fixed part.
Figure 3:
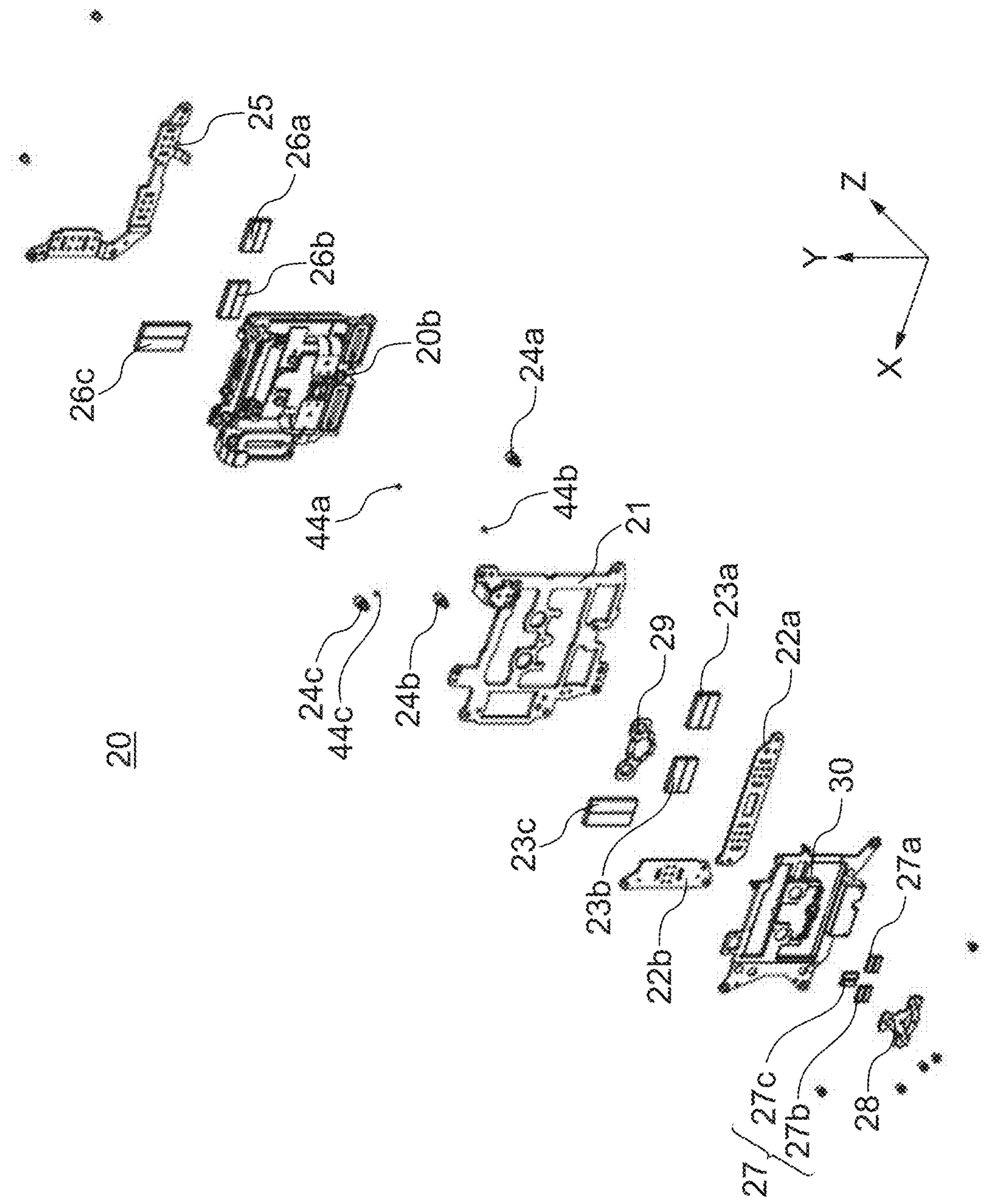
FIG. 3 is another exploded perspective view of the shake correction unit.

FIGS. 2 and 3 are exploded perspective views of the shake correction unit 20, and FIGS. 2 and 3 are different in the direction of viewing the shake correction unit 20. The shake correction unit 20 includes the fixed part 20*a* (first unit) and the movable part 20*b* (second unit). Note that in FIGS. 2 and 3, the movable part 20*b* is illustrated in an unexploded state, and the fixed part 20*a* is illustrated in an exploded state (symbol 20*a* is not specifically indicated). The fixed part 20*a* and the movable part 20*b* are each formed by combining one or more members.

The fixed part 20*a* includes a fixing member 21, a first rear yoke 22*a*, a second rear yoke 22*b*, a first rear magnet group 23*a*, a second rear magnet group 23*b*, and a third rear magnet group 23*c*. The first rear magnet group 23*a* and the second rear magnet group 23*b* are fixed to the first rear yoke 22*a*, and the third rear magnet group 23*c* is fixed to the second rear yoke 22*b* e.g. with an adhesive.

The fixed part 20*a* further includes a first columnar member 24*a*, a second columnar member 24*b*, a third columnar member 24*c*, a front yoke 25, a first front magnet group 26*a*, a second front magnet group 26*b*, and a third front magnet group 26*c*. The front yoke 25 is fixed to the fixing member 21 with screws via the first columnar member 24*a*, the second columnar member 24*b*, and the third columnar member 24*c*. The first front magnet group 26*a*, the second front magnet group 26*b*, and the third front magnet group 26*c* are fixed to the front yoke 25 e.g. with an adhesive.

The fixed part 20*a* further includes detection magnet groups 27, a detection yoke 28, a regulating member 29, and a cover 30. The detection magnet groups 27 are formed by a first detection magnet group 27*a*, a second detection magnet group 27*b*, and a third detection magnet group 27*c*. In the present embodiment, as each of the first detection magnet group 27*a*, the second detection magnet group 27*b*, and the third detection magnet group 27*c*, two magnets magnetized in an optical axis direction (Z direction) are arranged with a space such that the magnets generate magnetic fields in respective opposite directions. However, this is not limitative, but one magnet which is magnetized to two poles can be used. The detection magnet groups 27 are fixed to the detection yoke 28 e.g. with an adhesive. The first rear yoke 22*a*, the second rear yoke 22*b*, the front yoke 25, and the detection yoke 28 each play the role of a yoke, and hence a magnetic material is used.

Note that the fixed part 20*a* is expressed as such because it is a unit which functions as a position reference when the movable part 20*b* moves, but the fixed part 20*a* can be configured, for example, such that the fixed part 20*a* is held in a movable state for enabling adjustment of the position of the fixed part 20*a* with respect to the apparatus body 10*a*.

Further, as will be described hereinafter, the fixed part 20*a* supports the movable part 20*b* via a plurality of balls, but for example, the movable part 20*b* can be supported by connecting the base member 13*c* and the movable part 20*b* e.g. by a spring or wire.

Figure 4:
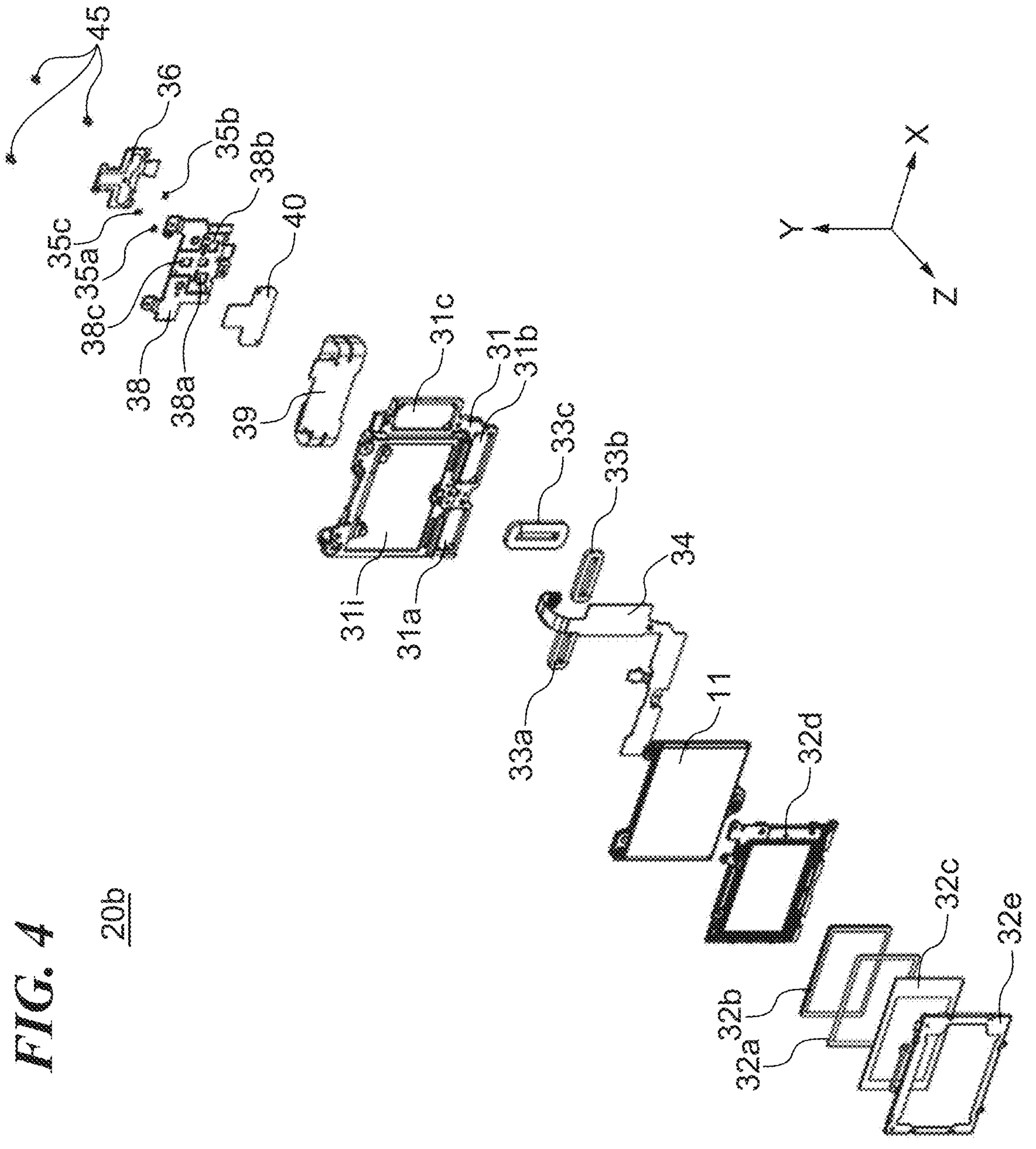
FIG. 4 is an exploded perspective view of the movable part.
Figure 5:
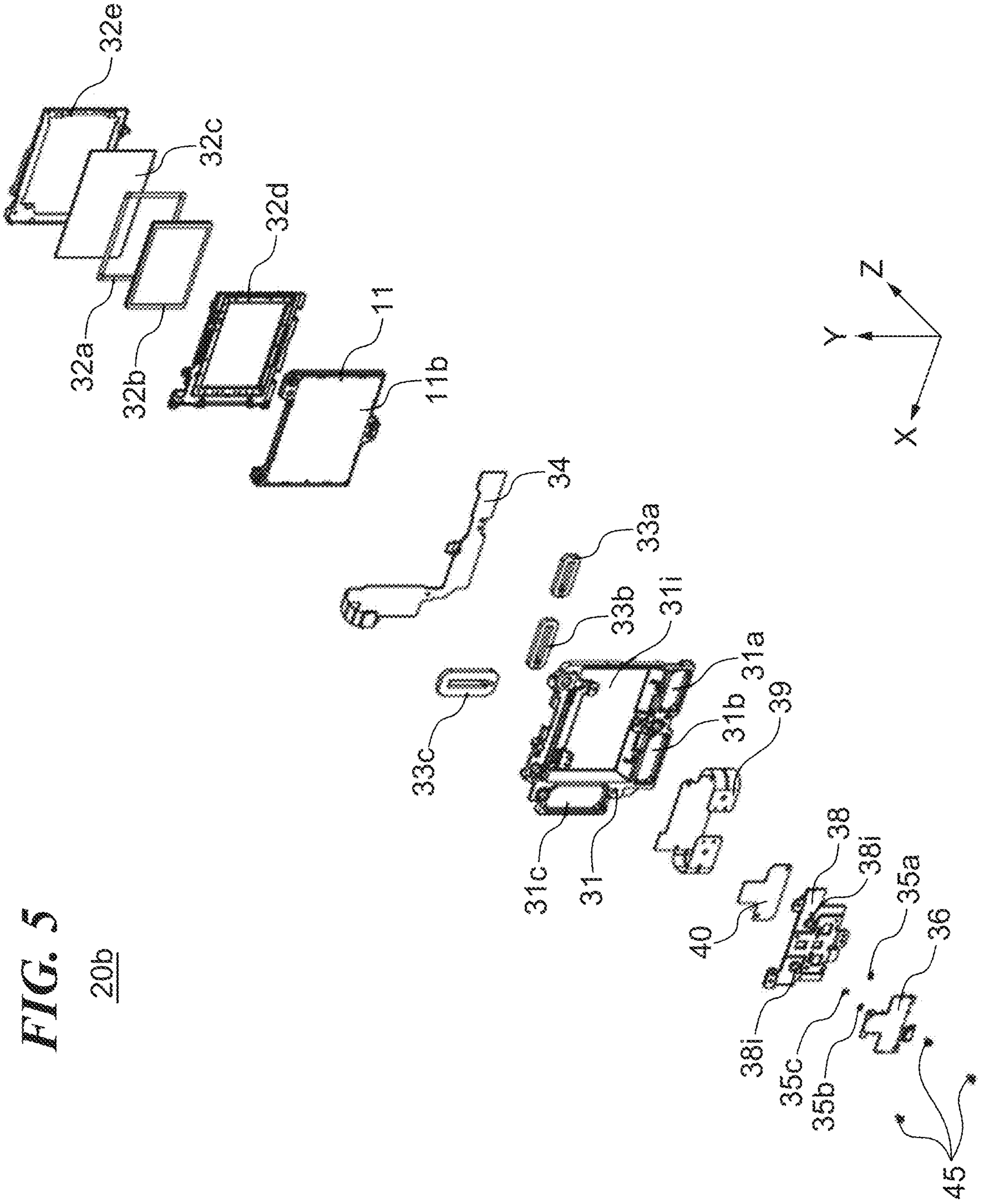
FIG. 5 is another exploded perspective view of the movable part.

FIGS. 4 and 5 are exploded perspective views of the movable part 20*b* and are different in the direction of viewing the movable part 20*b*.

The movable part 20*b* includes an image sensor-holding member 31 and the image sensor 11, and the image sensor 11 is fixed to the image sensor-holding member 31 (movable member) e.g. with screws, not shown, or an adhesive.

Further, the movable part 20*b* includes a mask 32*a*, an infrared absorption filter 32*b*, and an optical lowpass filter 32*c*. The mask 32*a*, the infrared absorption filter 32*b*, and the optical lowpass filter 32*c* are held by a holder member 32*d* and a holder sheet metal 32*e* and are fixed to the image sensor 11 e.g. with an adhesive member. Note that the movable part 20*b* can be formed without at least one of the mask 32*a*, the infrared absorption filter 32*b*, and the optical lowpass filter 32*c*.

The movable part 20*b* further includes a first coil 33*a*, a second coil 33*b*, a third coil 33*c*, and an actuation FPC 34. The actuation FPC 34 is electrically connected to the first coil 33*a*, the second coil 33*b*, and the third coil 33*c*. Further, the actuation FPC 34 is arranged in a state overlapping the first coil 33*a*, the second coil 33*b*, and the third coil 33*c*, on a plane projected in the optical axis (on the X-Y plane as viewed from the Z direction), and is fixed to the image sensor-holding member 31 e.g. with an adhesive.

The image sensor-holding member 31 has a first opening 31*a*, a second opening 31*b*, and a third opening 31*c*. The first coil 33*a*, the second coil 33*b*, and the third coil 33*c* are arranged in the first opening 31*a*, the second opening 31*b*, and the third opening 31*c*, respectively.

Further, the movable part 20*b* includes a connecting member 38 (movable member), and the connecting member 38 is bridged across an opening 31*i* of the image sensor-holding member 31 and fixed to the image sensor-holding member 31 with screws 45 at respective locations on opposite sides of the optical axis. The connecting member 38 is formed with contact portions 38*i* in two positions, and the contract portions 38*i* are brought into contact with the regulating member 29 of the fixed part 20*a*, whereby the movement of the movable part 20*b* within the optical axis orthogonal plane 12*c* is regulated within a predetermined range.

On the connecting member 38, a thrust yoke 40 (magnetic member) and a heat transfer member 39 are fixed to one side of the optical axis orthogonal plane 12*c*, e.g. with an adhesive, and a detection FPC 36 (first substrate) is fixed to the other side of the optical axis orthogonal plane 12*c*, e.g. with the adhesive. As the thrust yoke 40, a magnetic material is used to play the role of the yoke.

The detection FPC 36 has a detector 35 (position detecting device) mounted thereon. For the detector 35, hall elements, for example, are used, and in the present embodiment, the detector 35 is formed by a first detector 35*a*, a second detector 35*b*, and a third detector 35*c*.

The connecting member 38 includes a first opening 38*a*, a second opening 38*b*, and a third opening 38*c*. The first detector 35*a*, the second detector 35*b*, and the third detector 35*c* are arranged in the first opening 38*a*, the second opening 38*b*, and the third opening 38*c*, respectively. Thus, the first detector 35*a*, the second detector 35*b*, and the third detector 35*c* are not brought into contact with components other than the detection FPC 36. Further, the first detector 35*a*, the second detector 35*b*, and the third detector 35*c* are arranged at respective locations overlapping the image sensor 11, as viewed from the optical axis direction.

As shown in FIGS. 2 and 3, a first ball 44*a*, a second ball 44*b*, and a third ball 44*c* are arranged between the fixed part 20*a* and the movable part 20*b*. When the movable part 20*b* is operated, the first ball 44*a*, the second ball 44*b*, and the third ball 44*c* roll, whereby the movable part 20*b* is enabled to smoothly move relative to the fixed part 20*a* on the optical axis orthogonal plane 12*c*.

By combining the fixed part 20*a* and the movable part 20*b*, a voice coil motor (VCM), a detection magnetic circuit, and an urging magnetic circuit are formed. These circuits will be described below.

First, the VCM will be described.

In the fixed part 20*a*, the first rear magnet group 23*a* and the first front magnet group 26*a*, which are arranged in alignment in the optical axis direction, form a first actuator magnetic circuit. Similarly, the second rear magnet group 23*b* and the second front magnet group 26*b* form a second actuator magnetic circuit, and the third rear magnet group 23*c* and the third front magnet group 26*c* form a third actuator magnetic circuit. The first actuator magnetic circuit and the first coil 33*a* in the movable part 20*b* form a VCM as a first actuator. The second actuator magnetic circuit and the second coil 33*b* in the movable part 20*b* form a VCM as a second actuator. The third actuator magnetic circuit and the third coil 33*c* in the movable part 20*b* form a VCM as a third actuator. A Lorentz force is generated in a direction orthogonal to a magnetic field generated by the first actuator magnetic circuit in the optical axis direction and an electric current flowing in the first coil 33*a*, and according to the energization direction of the first coil 33*a*, a resultant force direction of the Lorentz force is changed. The same Lorentz forces are also generated with respect to the second actuator magnetic circuit and the second coil 33*b* and with respect to the third actuator magnetic circuit and the third coil 33*c*. The first actuator and the second actuator generate forces (actuation forces) substantially parallel to the Y direction, and a translational force in the Y direction is generated by the sum of these forces, and a rotational force about the optical axis is generated by a difference between these forces. On the other hand, the third actuator generates a translational force in the X direction.

Next, the urging magnetic circuit and the detection magnetic circuit will be described with reference to FIGS. 6, 7A, and 7B.

Figure 6:
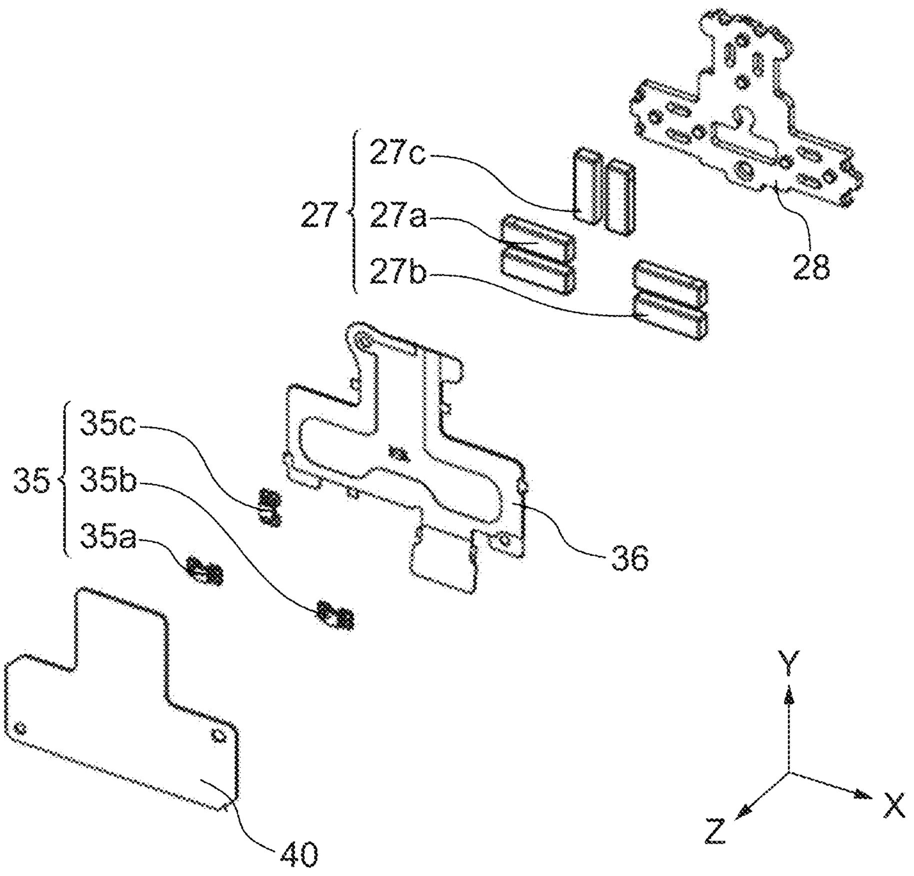
FIG. 6 is an exploded perspective view of an urging magnetic circuit and a detection magnetic circuit, formed by combining the movable part and the fixed part.

FIG. 6 is an exploded perspective view of the urging magnetic circuit and the detection magnetic circuit. FIG. 7A is a projection view of the detection magnetic circuit when the movable part 20*b* is positioned in the movable center, as viewed from the object side in the optical axis direction. FIG. 7B is a cross-sectional view taken along A-A in FIG. 7A.

First, the urging magnetic circuit will be described.

As shown in FIG. 6, the fixed part 20*a* includes the detection magnet groups 27, and the movable part 20*b* is equipped with the thrust yoke 40 at a location opposed to those. Referring to the first detection magnet group 27*a*, as shown in FIG. 7B, the magnetic flux of the first detection magnet group 27*a* flows to the thrust yoke 40, whereby an attractive force is generated between the first detection magnet group 27*a* and the thrust yoke 40. The attractive forces are similarly generated between the second detection magnet group 27*b* and the thrust yoke 40 and between the third detection magnet group 27*c* and the thrust yoke 40. Thus, the attractive force acts between the detection magnet groups 27 of the fixed part 20*a* and the thrust yoke 40 of the movable part 20*b*, whereby the movable part 20*b* is urged against the fixed part 20*a* in the optical axis direction (Z direction).

Next, the detection magnetic circuit will be described.

As shown in FIG. 6, the thrust yoke 40, the first detection magnet group 27*a*, and the detection yoke 28, which are arranged in alignment in the optical axis direction, form a first detection magnetic circuit. Similarly, the thrust yoke 40, the second detection magnet group 27*b*, and the detection yoke 28 form a second detection magnetic circuit, and the thrust yoke 40, the third detection magnet group 27*c*, and the detection yoke 28 form a third detection magnetic circuit.

The first detector 35*a* is arranged at a location opposed to the first detection magnet group 27*a* (position detecting magnet), the second detector 35*b* is arranged at a location opposed to the second detection magnet group 27*b*, and the third detector 35*c* is arranged at a location opposed to the third detection magnet group 27*c*. The thrust yoke 40 is arranged on an opposite side of the detection magnet groups 27 to the detectors 35 in the optical axis direction. Further, as viewed from the optical axis direction, the thrust yoke 40 is arranged such that the thrust yoke 40 covers the detectors 35.

The first detection magnetic circuit and the first detector 35*a* will be described with reference to FIG. 7B. The first detector 35*a* is arranged between the first detection magnet group 27*a* and the thrust yoke 40. Therefore, the first detector 35*a* performs position detection in a state in which the magnetic flux of the first detection magnet group 27*a* is flowing to the thrust yoke 40. Similarly, the second detector 35*b* performs position detection in a state in which the magnetic flux of the second detection magnet group 27*b* is flowing to the thrust yoke 40. Further, the third detector 35*c* performs position detection in a state in which the magnetic flux of the third detection magnet group 27*c* is flowing to the thrust yoke 40. Thus, the detectors 35 perform position detection in the magnetic field formed by the detection magnet groups 27 of the fixed part 20*a* and the thrust yoke 40 of the movable part 20*b*, whereby it is possible to perform position detection with high accuracy. Note that in the present embodiment, the detection magnet groups 27 are arranged in the fixed part 20*a*, and the detectors 35 are arranged in the movable part 20*b*. This is because, when the weight is compared between the detection magnet groups 27 and the detectors 35, the detectors 35 are lighter, and hence it is possible to make the actuation load of the movable part 20*b* smaller when the detectors 35 are configured to be arranged in the movable part 20*b* than when the detection magnet groups 27 are configured to be arranged in the movable part 20*b*.

Next, the flow of the magnet flux of the detection section in a case where the movable part 20*b* is moved will be described with reference to FIGS. 7A and 7B, and FIGS. 8A and 8B. FIG. 8A is a projection view of the detection magnetic circuits as viewed from the object side in the optical axis direction when the movable part 20*b* is positioned at an anti-shake control end. FIG. 8B is a cross-sectional view taken along B-B in FIG. 8A.

Since the thrust yoke 40 and the detectors 35 are provided in the movable part 20*b*, the thrust yoke 40 and the detectors 35 are moved relative to the detection magnet groups 27 in accordance with movement of the movable part 20*b*.

Figure 7A:
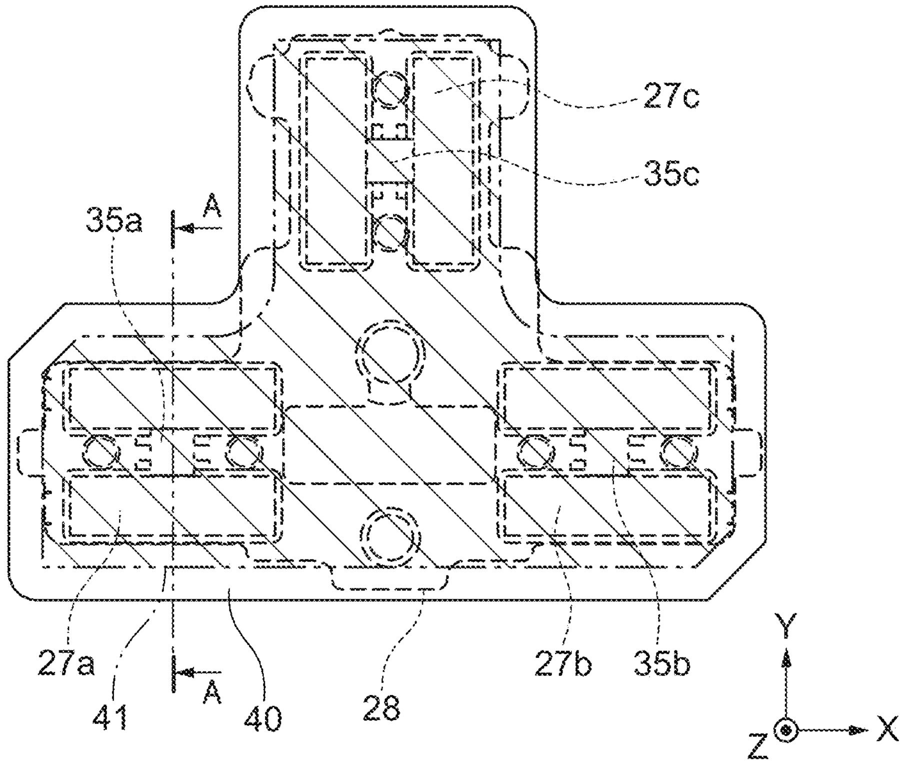
FIGS. 7A and 7B are a projection view of the detection magnetic circuit in an optical axis direction when the movable part is positioned in the movable center, and a cross-sectional view of the same, respectively.
Figure 7B:
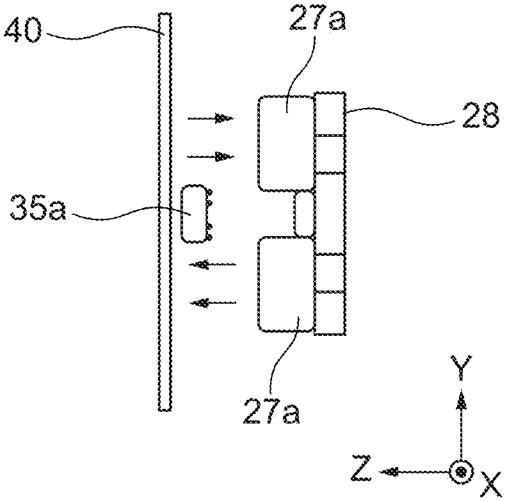
Figure 8A:
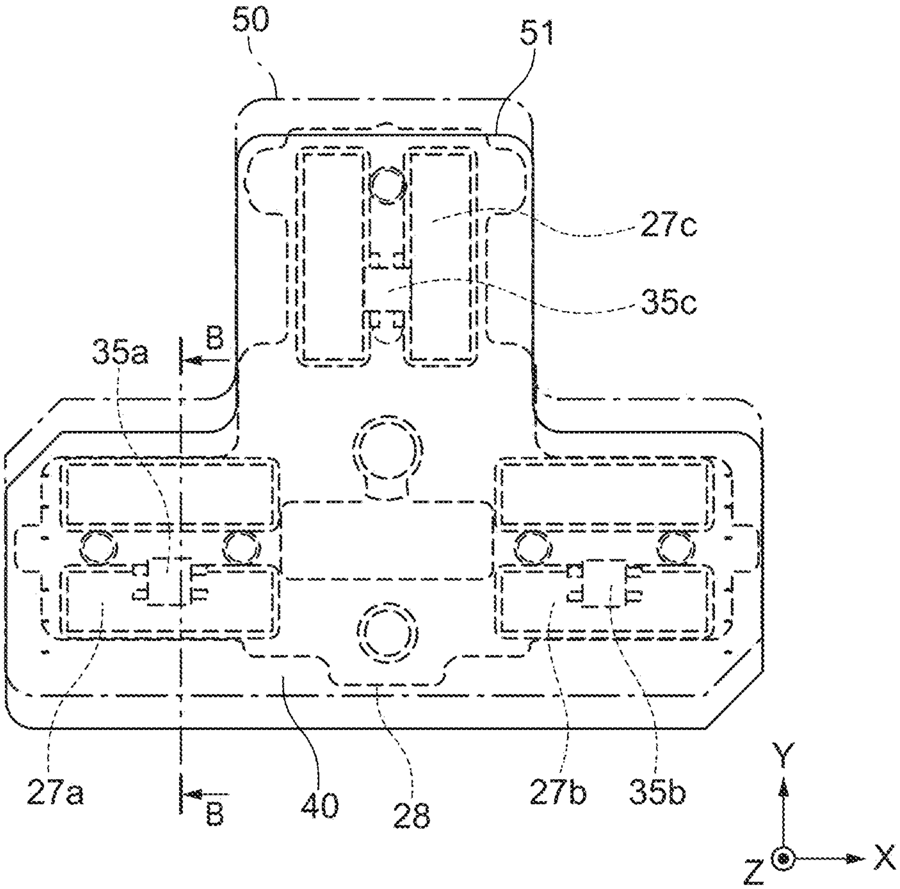
FIGS. 8A and 8B are a projection view of the detection magnetic circuit in the optical axis direction when the movable part is positioned at an anti-shake control end, and a cross-sectional view of the same, respectively.
Figure 8B:
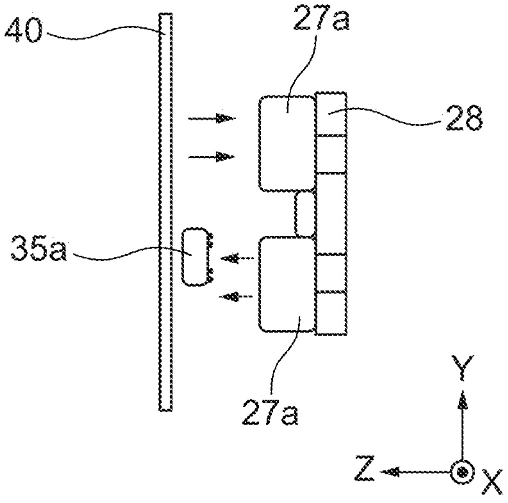

In FIG. 7A, an area (entire movable range area) in which the thrust yoke 40 is always included even in a case where the thrust yoke 40 moves is expressed as an area 41 by hatching in association with an anti-shake control range of the shake correction unit 20. The area 41 covers the detection magnet groups 27 (the first detection magnet group 27*a*, the second detection magnet group 27*b*, and the third detection magnet group 27*c*). With this, the detection magnet groups 27 can be covered by the thrust yoke 40 in an entire anti-shake control range area.

FIG. 8A shows a case where the thrust yoke 40 has moved from a movable center position 50 indicated by dashed lines to an anti-shake control end position 51 indicated by solid lines. As shown in FIG. 8A, the thrust yoke 40 also covers the detection magnet groups 27 in a state in which the movable part 20*b* is in the anti-shake control end position 51. Therefore, also in this state, as shown in FIG. 8B, similar to the state in which the movable part 20*b* is in the movable center position 50 (see FIG. 7B), the magnetic flux generated by the first detection magnet group 27*a* flows to the thrust yoke 40. Further, similar to the magnetic flux generated by the first detection magnet group 27*a*, the magnetic flux generated by the second detection magnet group 27*b* and the magnetic flux generated by the third detection magnet group 27*c* also flow to the thrust yoke 40.

Thus, in the entire anti-shake control range area, the thrust yoke 40 covers the detection magnet groups 27. With this, it is possible to perform position detection by using the detectors 35 in the magnetic fields formed by the detection magnet groups 27 and the thrust yoke 40, and as a result, it is possible to perform position detection with high accuracy.

Note that the magnetic field is more stable in a configuration including the thrust yoke 40 than in a configuration without the thrust yoke 40, and hence it is possible to increase the accuracy of position detection performed by the detectors 35, but the thrust yoke 40 is not essential in the position detection performed by the detectors 35.

Further, the description has been given of the configuration in which the thrust yoke 40 is used for both of the urging magnetic circuit and the detection magnetic circuit, but different yokes can be used for the urging magnetic circuit and the detection magnetic circuit, respectively.

Figure 9:
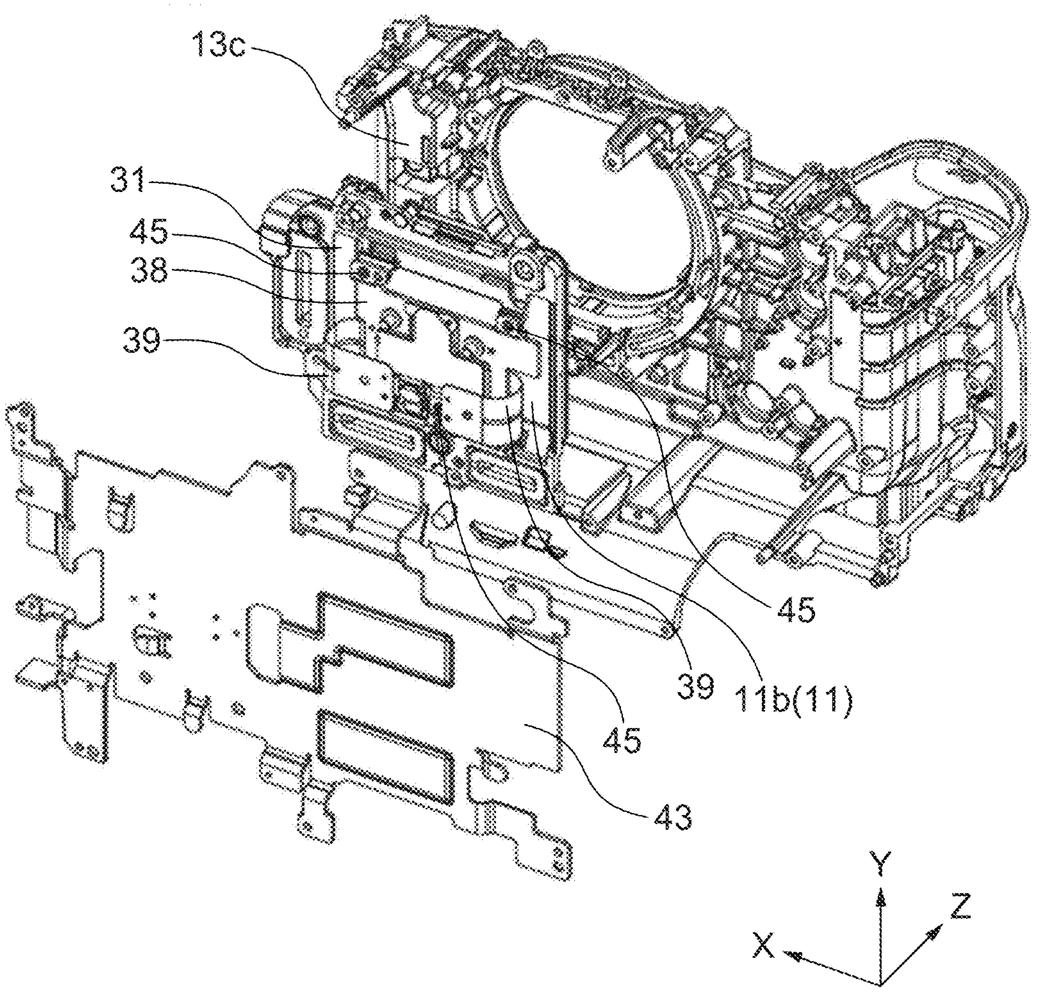
FIG. 9 is an exploded perspective view of components forming a heat dissipation path of an image sensor appearing in FIG. 1.
Figure 10A:
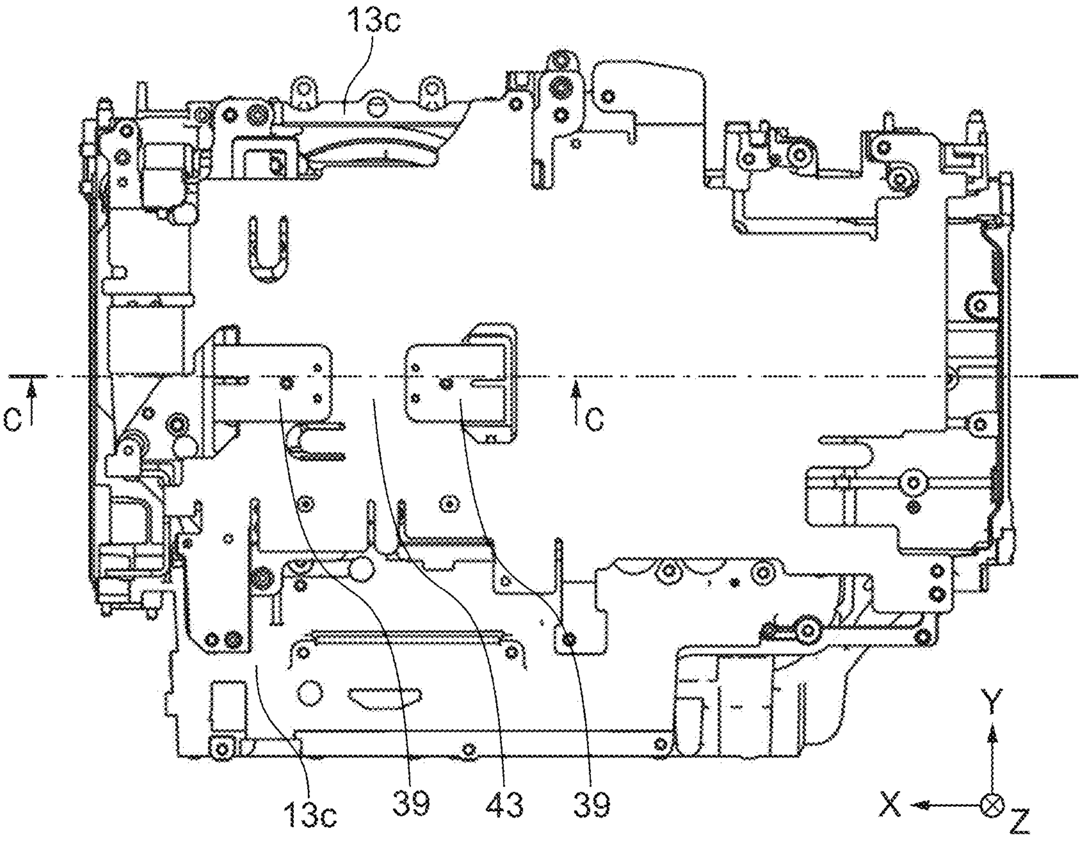
FIGS. 10A and 10B are a projection view of the components forming the heat dissipation path of the image sensor in the optical axis direction, and a cross-sectional view of the same, respectively.
Figure 10B:
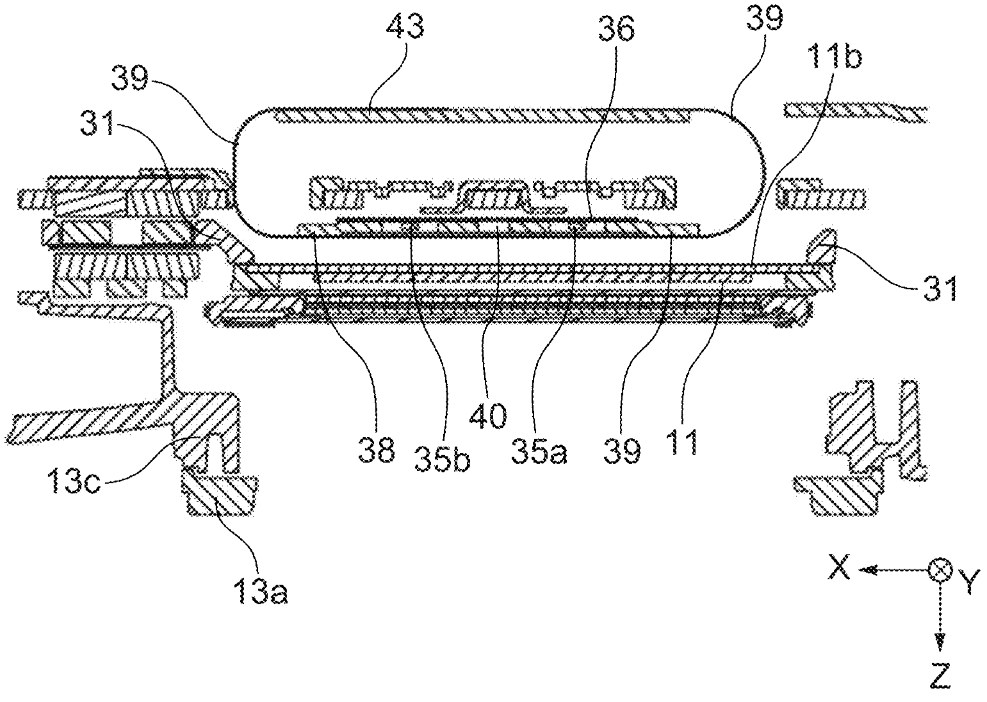

Next, a heat dissipation path of the image sensor 11 will be described with reference to FIGS. 9 and FIGS. 10A and 10B. FIG. 9 is an exploded perspective view of components forming the heat dissipation path of the image sensor 11. FIG. 10A shows a projection view, and FIG. 10B is a cross-sectional view taken along C-C in FIG. 10A.

Heat generated in the image sensor 11 is transferred to an image sensor board 11*b* (second substrate) fixed by die bonding. The image sensor board 11*b* is a rigid substrate, which has an area partially overlapping the image sensor-holding member 31, and transfers the heat to the image sensor-holding member 31 by surface contact in this area.

For the image sensor-holding member 31, a magnesium die casting, an aluminum die casting, or the like is employed. The image sensor-holding member 31 transfers the heat transferred from the image sensor board 11*b* to the connecting member 38 via three portions fixed with the screws 45.

An aluminum alloy or the like is employed for the connecting member 38. The heat transfer member 39 is connected to the connecting member 38, and a supporting member 43 is connected to the heat transfer member 39.

As shown in FIG. 10B, the supporting member 43 is a member connected to the base member 13*c*, and the connecting member 38 is movable relative to the supporting member 43. That is, the heat transfer member 39 has one end connected to the connecting member 38 of the movable part 20*b* and the other end connected to the supporting member 43 of the fixed part 20*a*. Therefore, to prevent the movement of the movable part 20*b* from being inhibited, a sheet member having flexibility, which is approximately 0.1 mm in thickness, such as a graphite sheet, is employed for the heat transfer member 39. Note that the graphite sheet is a member having higher thermal conductivity than the connecting member 38, and with this, the heat transfer member 39 can efficiently transfer heat from the connecting member 38 to the supporting member 43.

With this, the heat generated in the image sensor 11 and transferred from the image sensor-holding member 31 to the connecting member 38 is transferred to the supporting member 43 via the heat transfer member 39. Further, the heat transferred to the supporting member 43 is transferred to the base member 13*c* and finally discharged from the base member 13*c* to the outside air. Note that an aluminum alloy or the like is employed for the supporting member 43, and a magnesium die casting, an aluminum die casting, or the like is employed for the base member 13*c*.

Next, the heat transfer path from the image sensor 11 to the detectors 35 will be described.

As described above, the heat generated in the image sensor 11 is transferred to the connecting member 38 via the image sensor board 11*b* and the image sensor-holding member 31. To the connecting member 38, not only the heat transfer member 39, but also the detection FPC 36 is connected, and hence part of the heat transferred to the connecting member 38 is transferred to the detection FPC 36, and part of this heat is further transferred to the detectors 35. The detection FPC 36 is a flexible printed circuit board and has a thermal conductivity equal to or lower than 1/100 of those of the image sensor-holding member 31 and the connecting member 38. Therefore, the heat transferred from these members to the detection FPC 36 can be suppressed to be small. Further, the detection FPC 36 is lower in thermal conductivity than the image sensor board 11*b* (second substrate). With this, compared with a case where the detectors 35 are mounted on the image sensor board 11*b*, it is possible to suppress transfer of heat generated in the image sensor 11 to the detectors 35.

Note that although the thrust yoke 40 as well is connected to the connecting member 38, the detection FPC 36 is lower in thermal conductivity than the thrust yoke 40. Therefore, the heat transferred to the connecting member 38 is more easily transferred to the thrust yoke 40 than the detection FPC 36, and the heat transferred to the detection FPC 36 can be suppressed to be small. As a result, it is possible to suppress heat transfer to the detectors 35.

Further, the detection FPC 36 has characteristics that the thermal conductivity is lower than the heat transfer member 39. Therefore, the heat transferred from the image sensor 11 to the connecting member 38 is more easily transferred to the heat transfer member 39 than the detection FPC 36, and the heat transferred to the detection FPC 36 can be suppressed to be small. As a result, it is also possible to suppress heat transfer to the detectors 35. Note that as described above, since the detectors 35 are not brought into contact with a component other than the detection FPC 36, as the heat transfer path from the image sensor 11 to the detectors 35, a path passing through the image sensor board 11*b*, the image sensor-holding member 31, the connecting member 38, and the detection FPC 36 transfers heat most readily. Even in this path which transfers heat most readily, the heat transferred to the detection FPC 36 can be suppressed to be small due to a relationship of the thermal conductivity between the detection FPC 36 and the other members. Note that although it can be assumed that heat is transferred from the image sensor 11 to the detectors 35 through air between the image sensor 11 and the detectors 35, air is further lower in thermal conductivity than the detection FPC 36, and hence the above-mentioned path is the path which transfers heat most readily. Further, the detectors 35 can be brought into contact with a member different from the detection FPC 36 insofar as it is a member lower in thermal conductivity than the detection FPC 36. In other words, the configuration is only required that the detectors 35 are prevented from being brought into contact with a member which is higher in thermal conductivity than the detection FPC 36.

Thus, by suppressing heat transfer from the image sensor 11 to the detectors 35, it is possible to suppress changes in the temperature of the detectors 35, which are caused by heat generated in the image sensor 11, and as a result, it is possible to realize high-accuracy position detection performed by the detectors 35.

Note that although in the present embodiment, the image sensor-holding member 31 and the connecting member 38 are provided as the separate members, they can be integrally formed as a movable member. Further, the image sensor 11 and the image sensor board 11*b* can be collectively referred to as the image sensor. In this case, as the heat transfer path from the image sensor 11 to the detectors 35, a path passing through the movable part 20*b* and the detection FPC 36 can be referred to as the path which transfers heat most readily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-063883 filed Apr. 11, 2024, which is hereby incorporated by reference herein in its entirety.

What is claimed is:

1. An image capturing apparatus including a first unit and a second unit which is movably arranged relative to the first unit in a predetermined range within a plane, wherein the second unit comprises:

an image sensor that has an imaging surface orthogonal to an optical axis;

a movable member that holds the image sensor;

a first substrate that is fixed to the movable member; and a position detecting device that is arranged at a location overlapping the image sensor as viewed from the optical axis direction and mounted on the first substrate, wherein the first unit has a position detecting magnet arranged at a location opposed to the position detecting device, and wherein a path which transfers heat generated in the image sensor most readily to the position detecting device is a path passing through the movable member and the first substrate, and the first substrate is lower in thermal conductivity than the movable member.

2. The image capturing apparatus according to claim 1, wherein the movable member is formed by an image sensor-holding member that holds the image sensor and a connecting member that is connected to the image sensor-holding member.

3. The image capturing apparatus according to claim 2, further comprising a heat transfer member that is higher in thermal conductivity than the first substrate, and wherein the heat transfer member has one end connected to the connecting member and the other end connected to the first unit.

4. The image capturing apparatus according to claim 3, wherein the heat transfer member is higher in thermal conductivity than the connecting member.

5. The image capturing apparatus according to claim 1, wherein the image sensor is held by the movable member via a second substrate, and wherein the first substrate is lower in thermal conductivity than the second substrate.

6. The image capturing apparatus according to claim 1, wherein the movable member includes a magnetic member, wherein the magnetic member is arranged at a location opposed to the position detecting magnet in the optical axis direction, and wherein the position detecting device is arranged between the magnetic member and the position detecting magnet.

7. The image capturing apparatus according to claim 6, wherein the magnetic member is connected to the movable member, and the first substrate is lower in thermal conductivity than the magnetic member.

8. The image capturing apparatus according to claim 6, wherein the magnetic member is arranged such that the magnetic member covers the position detecting device as viewed from the optical axis direction.

9. The image capturing apparatus according to claim 6, wherein in an entire movable range area of the movable member, the magnetic member covers the position detecting magnet as viewed from the optical axis direction.

10. An image capturing apparatus including a first unit and a second unit which is movably arranged relative to the first unit in a predetermined range within a plane, wherein the second unit comprises:

an image sensor that has an imaging surface orthogonal to an optical axis;

a movable member that holds the image sensor;

a first substrate that is mounted on the movable member; and a position detecting device that is arranged at a location overlapping the image sensor as viewed from the optical axis direction and mounted on the first substrate, wherein the first unit has a position detecting magnet arranged at a location opposed to the position detecting device, wherein the first substrate is lower in thermal conductivity than the movable member, and wherein the position detecting device is not brought into contact with a member which is higher in thermal conductivity than the first substrate.

* * * * *